(12) United States Patent
Kotrotsios (10) Patent No.: US 6,397,554 B1
(45) Date of Patent: Jun. 4, 2002

(54) ENERGY-SAVING HEAT INSULATION OF BUILDINGS

(76) Inventor: Dimitrios Kotrotsios, 54500 Drimos Thessalonikis (GR)

( * ) Notice: Subject to any disclaimer, the term of this patent is extended or adjusted under 35 U.S.C. 154(b) by 0 days.

(21) Appl. No.: 09/486,011

(22) PCT Filed: May 28, 1999

(86) PCT No.: PCT/GR99/00021

§ 371 (c)(1),
(2), (4) Date: Feb. 18, 2000

(87) PCT Pub. No.: WO99/67473

PCT Pub. Date: Dec. 29, 1999

(30) Foreign Application Priority Data

Jun. 22, 1998 (GR) .......................................... 980100228

(51) Int. Cl.$^7$ ................................................. E04B 1/76
(52) U.S. Cl. ......................... 52/741.4; 52/404.1; 52/515
(58) Field of Search ........................... 52/741.4, 741.41, 52/515, 612, 404.1; 126/617

(56) References Cited

U.S. PATENT DOCUMENTS

| | | | | |
|---|---|---|---|---|
| 2,076,898 A | * | 4/1937 | Labus et al. | ............... 52/612 X |
| 2,714,816 A | * | 8/1955 | Pennell | ...................... 52/316 X |
| 4,610,115 A | * | 9/1986 | Thompson, Jr. | ........... 52/171.3 |
| 5,092,101 A | * | 3/1992 | Kunert | ..................... 52/786.11 |
| 5,422,143 A | * | 6/1995 | Yiu | ........................... 427/397.8 |
| 5,590,501 A | * | 1/1997 | Stoddart et al. | ........ 52/309.8 X |
| 5,904,963 A | * | 5/1999 | Blatter | ...................... 52/561 X |
| 6,103,003 A | * | 8/2000 | Ledbetter | ..................... 106/409 |

FOREIGN PATENT DOCUMENTS

JP 55-129549 * 10/1980 .............. 52/309.17

OTHER PUBLICATIONS

Database WPI, Section Ch, Week 8238, Derwent Publications Ltd., & JP 57 129860.
Database WPI, Section CH, Week 1775, Derwent Publications Ltd., & JP 50 007624.

* cited by examiner

Primary Examiner—Laura A. Callo
(74) Attorney, Agent, or Firm—Arent Fox Kintner Plotkin & Kahn, PLLC

(57) ABSTRACT

The thermal insulation of buildings is realized by the diffused reflection of thermal radiation and the diffused reflection of the thermal transition of the air, from the internal and the external surfaces of the sublayers of the external masonry, the external roofs, the internal masonry and the internal ceilings of the buildings. Thermal insulation is also realized by a low emission of thermal radiation, with the diffused reflection of thermal radiation and the diffused reflection of thermal transition of air, from the internal surfaces of a parallel plane division having an enclosed layer of air, which is surfaces of a parallel plane division having an enclosed layer of air, which is constructed at the internal side of the sublayers of the external masonry and the external roof of the buildings. These surfaces are covered with a reflective insulating material, which can be colored with the addition of coloring pigments. When dry, the reflective insulating material is not dissolvable in water and forms the final surface of the sublayers. The insulating material utilizes microscopic convex granules attached to the surface with a binder.

1 Claim, 2 Drawing Sheets fig 1 fig 2 fig 3 fig 4 fig 5 fig 6 fig 7 fig 8 fig 9 fig 10 fig 11 fig 12 fig 13 fig 14 fig 15

ENERGY-SAVING HEAT INSULATION OF BUILDINGS

This invention refers to a new method of thermal insulation of buildings, with a diffused reflection of the thermal radiation and a diffused reflection of the thermal transition of the air.

The practical implementation is made with two manners.

1. With a diffused reflection of the thermal radiation and a diffused reflection of the thermal transition of the air, from the internal and the external surfaces of the sub-layers of the external masonry, of the external roofs, the internal masonry and the internal ceilings of the buildings.

2. With a low emission of thermal radiation, with a diffused reflection of thermal radiation and a diffused reflection of thermal transition of the air, from the internal surfaces of a parallel plane division with an enclosed layer of air, which is constructed at the internal side of the sub-layers of the external. masonry and the external roofs of the buildings.

The diffused reflection of the thermal radiation and the diffused reflection of the thermal transition of the air, as well as the low emission of thermal radiation, are attained with a liquid reflective insulating (heat insulating and sealing) material, white colored, used to cover the surfaces of the above sub-layers and which constitute the final surface of these sub-layers.

The white colored liquid reflective insulating material, is manufactured in three types A, B and C, and can be colored with the addition of coloring pigments, and following its practical application, in a solid form (after it dries), it does not dilute in water.

The loss of heating energy and cooling energy of internal spaces of buildings, through the sub-layers of the external masonry and the external roofs of the buildings, as well as, through the sub-layers of their internal masonry and their internal ceilings, which are close to non-heated and non-cooled closed spaces, are due to:

The absorption of an important quantity of energy, by the falling thermal radiation and the falling thermal transition of the air, from the internal and the external surfaces of these sub-layers.

The absorbed energy is transformed into heat and is transmitted with thermal convection inside these sub-layers.

The absorption of an important quantity of energy, by the internal and external surfaces of these sub-layers, is due to the following reasons:

1. The internal and external surfaces of the above sub-layers are non-reflective, because they are moderately electrically conductive, externally and non-heat-insulating.

Being moderately electrically conductive, externally, these surfaces absorb the larger part of energy from the falling thermal radiation, because the energy equilibrium of their mass is disturbed at an important degree.

Being non-heat-insulating, these surfaces absorb the larger part of energy, of the falling thermal transition of the air, because the energy equilibrium of their mass is disturbed at an important degree.

2. The internal and external surfaces of the above sub-layers are mainly consisting of a set of millions of microscopic concave surfaces, of an irregular and different shape, for each single concave microscopic surface.

Figure 1:
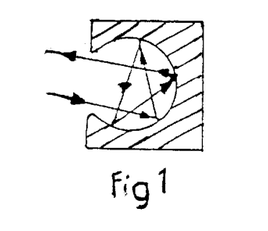
In FIG. 1 we see in section, the absorption of the thermal radiation that falls on a concave surface.
Figure 2:
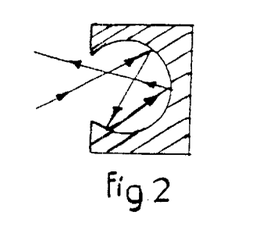
In FIG. 2 we see in section, the absorption of the thermal transition of the air, that falls on a concave surface.

The concave microscopic surfaces increase the surface on which falls the thermal radiation and the thermal transition of the air and absorb an important quantity of energy, because:

a) They absorb (focus, concentrate) the thermal radiation which falls over them, due to the successive reflections of electromagnetic waves, over every concave, microscopic surface, FIG. 1.

b) They absorb (focus, concentrate) the thermal transition of the air that falls over them, due to the successive reflections of the atoms of the mass molecules of the air at a higher temperature, on every concave, microscopic surface, FIG. 2.

Figures 3, 6:
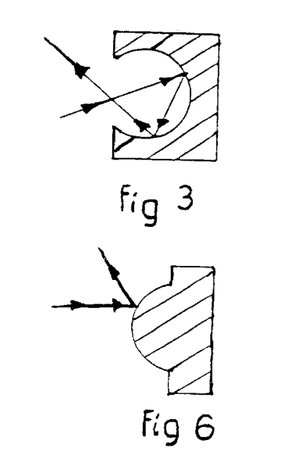
In FIG. 3 we see in section, the absorption of the sound waves that fall on a concave surface.
In FIG. 6 we see in section, the absorption of the sound waves that fall on a convex surface.

The concave, microscopic surfaces absorb an important quantity of energy from the sound waves (from the oscillations of the air pressure) which fall on them, because:

They absorb (focus, concentrate) the sound waves (the oscillations of the air pressure) which fall on them, due to the successive reflections of the sound waves, on every concave, microscopic surface, FIG. 3.

Until this day, the conventional heat insulation of the internal spaces of buildings, is being used with the addition of heat insulating material inside the sub-layers of the external masonry and the external roofs of the buildings, as well as their sub-layers of their internal masonry and their internal ceilings, which are in contact to non-heated and non-cooled closed spaces.

The heat insulating material that is being added, does not form the final surface of these sub-layers.

With the addition of a heat insulating material inside the above sub-layers, the resistance to heat-leak $1/\Lambda$ is increased and the coefficient of heat transfer K (coefficient of heat permeability) is decreased, having as a result the decrease of heating energy and cooling energy losses of internal spaces of sub-layers of buildings, through these sub-layers.

The heat transfer coefficient K, is the same for losses of heating and cooling energy, through each of the above sub-layers of the building materials and structural element.

The conventional heat insulation of the internal spaces of buildings presents the following disadvantages:

1. A large consumption of energy is required, having as a result, the pollution of the environment.

The increased consumption of energy is due to the following reasons:

a) The manufacture of large quantities of heat-insulating materials and their transport.

b) The manufacture of large quantities of sealing materials, for the protection of the heat-insulating capacity of the heat-insulating materials.

1. A large consumption of energy and a high heating and cooling costs of the internal spaces of buildings, are required for the following reasons:

a. To the losses of heating energy, at the starting of the heating operation of internal spaces of buildings.

b. To the losses of heating and cooling energy, from the protrusions of the concrete (thermal-bridges) of the roofs and facades of the buildings.

c. To the increased losses of heating energy and cooling energy, of the internal spaces of the buildings, because the further decrease of these losses is uneconomical.

2. The effective surface of the internal spaces of buildings is decreased due to the increase of the thickness of the external masonry.

3. The great cost for the insulation of new and existing non-insulated buildings, due to the long duration of the insulation works.

4. Great erection cost for new buildings, due to the large insulating costs and the decrease of the effective surface of the internal spaces of these buildings.

The energy-saving heat insulation of the buildings, with a diffused reflection of the thermal radiation and diffused reflection of the thermal transition of the air, is a new method for the heat insulation of buildings.

Its practical application is realized with two manners, that is:

1. With a diffused reflection of thermal radiation and with a diffused reflection of thermal transition of the air, from the internal and external surfaces of the sub-layers of external masonry, the external roofs, the internal masonry and the internal ceilings of the buildings.

2. With a low emission of thermal radiation, with a diffused reflection of thermal radiation and a diffused reflection of thermal transition of the air, from the internal surfaces of a parallel plane division with an enclosed layer of air, which is constructed at the internal side of the sub-layers of the external masonry and the external roofs of the buildings.

The know-how for its construction, transforms the non-insulating and non-reflective internal and external surfaces of the sub-layers of the external and the internal masonry, the external roofs and the internal ceilings of the buildings, as well as the internal surfaces of the parallel level division with an enclosed air layer, into heat-insulating and reflective to the thermal radiation and to the thermal transition of the air, as follows:

These surfaces are covered with a white colored liquid reflective insulating (heat insulating and sealing) material, which forms the final surface of these sub-layers.

The white colored liquid reflective insulating material, is manufactured in three types A, B and C and can be colored with the addition of coloring pigments and after its practical application in a solid form (when it dries), it is does not dilute in water.

These surfaces are heat reflective because they are externally electrically conductive and heat insulating.

They reflect (re-emit) in a diffused manner the larger part of energy of the falling thermal radiation and the falling thermal transition of the air, because:

1. Being electrically conductive externally, these surfaces reflect (re-emit) the larger part of energy of the falling thermal radiation and have a low emission of thermal radiation, because the energy equilibrium of their mass is disturbed at a small degree.

2. Being heat insulating, these surfaces reflect the larger part of energy of the falling thermal transition of the air, because the energy equilibrium of their mass is disturbed at a small degree.

They are formed by a set of millions of heat-insulating convex microscopic surfaces, with the same geometric shape for every heat-insulating convex microscopic surface, which contain enclosed immobilized air.

Figure 4:
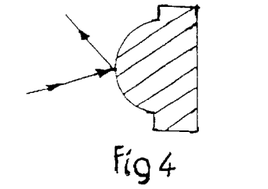
In FIG. 4 we see in section, the absorption of the thermal radiation that falls on a convex surface.
Figure 5:
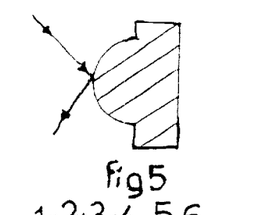
In FIG. 5 we see in section, the absorption of the thermal transition of the air, that falls on a convex surface.

The microscopic convex surfaces, decrease the surface on which fall the thermal radiation and the thermal transition of the air and they absorb a smaller quantity of energy, because:

a) At the fall of the thermal radiation, the successive reflections of electromagnetic waves are avoided on every convex microscopic surface, FIG. 4.

b) At the fall of the thermal transition of the air, the successive reflections of atoms, from the mass molecules of the air with a higher temperature, are avoided, on every convex microscopic surface, FIG. 5.

The convex, microscopic surfaces, absorb a smaller quantity of energy, from the sound waves (from the oscillations of the air's pressure) which fall over them, because:

At the fall of the sound waves, their successive reflection on every convex microscopic surface is prevented FIG. 6.

Given that the internal and external surfaces of the sub-layers of the external masonry and the external roofs of the buildings are strained at a different extent, by the climatic conditions and the environmental influences, and the degree of requirements on the visual quality of coloring is different:

The liquid reflective insulating (heat insulating and sealing) material is made in three types A, B and C.

The composition of the liquid reflective insulating material, which guarantees an efficacious operation of the new method for the heat insulation of buildings, is the following:

1. Expanded perlite, with a microscopic granulometry 0 up to 130 $\mu$m, convex and of the same geometric shape for every convex microscopic granule, or 1a. Expanded ceramic material, with a microscopic granulometry 0 up to 130 $\mu$m, convex and of the same geometric shape for every convex microscopic granule.

2. Binding material, 100% pure acrylic.
3. Elastomeric co-polymerized acrylic.
4. Synthetic(plastic) materials.
5. White coloring pigments of titanium oxides.
6. Mineral chloric sodium.
7. Aluminum oxide.
8. Silica oxide.
9. Liquid silicone.
10. Fungicide material.
11. Antifreezing material.
12. Water.

The proportion per volume, of the above materials (components), differs for every type of liquid reflective insulating material, that is:

Type A, provides an increased visual quality of the coloring on the covered surfaces and has a lower resistance against stresses from climatic conditions and environmental influences, in comparison to types B and C.

Type A is used for the coating of the internal surfaces of sub-layers of the external masonry and roofs of buildings, the surfaces of their internal masonry and one internal surface of the parallel flat division with enclosed air layer.

Type B provides a decreased visual coloring quality of the covered surfaces and has an increased resistance to stresses, due to climatic conditions and environmental influences, in comparison to type A.

Type B is used to cover the external surfaces of sub-layers of the external masonry of buildings, the external surfaces of projections of those sub-layers and one internal surface of the parallel flat division with enclosed air layer, of the external masonry.

Type C provides a decreased visual coloring quality of the covered surfaces and has an increased resistance to stresses due to climatic conditions and environmental influences, in comparison to type B.

Type C is used to cover the external surfaces of sub-layers of external roofs of buildings, the external surfaces of projections of those sub-layers and one internal surface of the parallel flat division, with enclosed air layer, of the external roofs.

During the coating of the three types A, B and C of liquid reflective insulating material, the expanded convex microscopic granules are distributed in equal parts and cover uniformly the surface of every sub-layer, due to their content of liquid silicone.

After the evaporation of its humidity, a unified and compact heat-insulating layer of a small thickness, with increased reflective and sealing capacity is formed.

The properties of the three types A, B and C of the liquid reflective insulating material in solid form (when it dries), are the following:

1. Its primary color is white. It can be colored with the addition of coloring pigments and after its practical application in solid form (when it dries) it is not water-soluble.

2. It has high coefficient of thermal radiation and thermal transition of the air, due to the convex microscopic surfaces which are formed by the expanded convex microscopic granules and due to its content in:

a) Mineral chloric sodium, for the reflection of the infrared radiation.

b) Aluminum oxide, for the reflection of the thermal radiation of a high wave length.

c) White coloring Titanium oxides pigments for the reflection of the visible radiation.

d) Silica oxide, for the reflection of the ultraviolet radiation.

e) Immobilized enclosed air, inside the convex microscopic granules, for the increase of its heat-insulating quality and the reflection thermal transition of the air and the sound waves (the oscillations of the air pressure).

2.1. The type A has the following coefficients:

$\rho=80\%$, for falling thermal radiation Q=370 W/m$^2$ up to 500 W/m$^2$.

$\rho_1=86\%$, for internal air temperature $T_1=18°$ C. up to 250° C.

$A=\epsilon=0.2$ and $\rho_2=70\%$.

2.2. The type B has the following coefficients:

$\rho=82\%$, for falling thermal radiation Q=500 W/m$^2$ up to 900 W/m$^2$.

$\rho_1=88\%$, for external air temperature $T_2=28°$ C. up to 55° C.

$A=\epsilon=0.18$ and $\rho_2=75\%$.

2.3. The type C has the following coefficients:

$\rho=84\%$, for falling thermal radiation Q=500 W/m$^2$ up to 1100 W/m$^2$.

$\rho_1=90\%$, for external air temperature $T_2=28°$ C. up to 55° C.

$A=\epsilon=0.16$ and $\rho_2=85\%$.

Where:

$\rho$ is the reflection coefficient of the thermal radiation.

A is the degree of absorption of the thermal radiation.

$\epsilon$ is the emission coefficient of the thermal radiation.

$\rho_1$ is the reflection coefficient of the thermal transition of the air.

$\rho_2$ is the reflection coefficient of the sound waves.

$\epsilon=A$ the same temperature of the liquid reflective insulating material, in solid form.

Changing the percentage in volume of the above ingredients, we reach different coefficients.

3. It has a strong adhesion, due to its content in synthetic (plastic) materials.

4. It is elastic.

Due to its elasticity, it follows the movements of the sub-layers of the construction materials and the structural elements, during their expansion and contraction and thus, the creation of thermal bridges (fissures and cracks) is avoided, on their covered surfaces.

Types B and C have a higher elasticity, in comparison to type A.

It retains its elasticity from −30° C. to +120° C.

5. It is water permeable (it breaths).

It presents a low resistance to the diffusion of water vapors and allows their easy escape, from the sub-layers of the construction materials and the structural elements.

6. It is non-permeable by carbon dioxide $CO_2$.

It presents increased resistance to the diffusion of carbon dioxide $CO_2$ and prevents the carbonization of the sub-layers of reinforced concrete.

7. It is sealing.

It becomes waterproof when water settles on its surface and prevents the escape of water vapors through the sub-layers.

When the water evaporates, it allows again the escape of the enclosed water vapors through the sub-layers.

8. It is solid and resists mechanical pressure and air pressure, leading to the result:

The creation of thermal bridges and sound bridges (fissures and cracks), on the covered internal and external surfaces of sub-layers of the construction materials and the structural elements, is avoided, due to the high velocity of the air and due to hailstone fall, storms and small objects carried by the wind on the coated external surfaces of these sub-layers.

Types B and C have a greater resistance, in comparison to type A.

Type C resists to the stress of normal practicability.

9. It is non combustible, due to its content in titanium oxides and in expanded inert matter.

10. It is resistant to environmental influences.

Types B and C present an increased content in synthetic (plastic) materials, compared to type A, which offers them a greater resistance to several chemical matters, like hoarfrost salts, atmospheric dirt, oils, benzene etc.

11. It presents a high resistance to aging.

Thanks to its composition, it is protected from aging influence, since it is not affected by the ultraviolet radiation and it is not eroded by the climate conditions and the environmental influences.

12. It retains for a long time, the quality of its coloring, because with the property of reflection, it repels dust, smoke and dirt in general.

The foreign particles laying on the covered surfaces of sub-layers of the construction materials and structural elements, lose photochemically their adhesion, thanks to the property of reflection, leading to the result that the internal covered surfaces can be cleaned easily and the covered external surfaces of these sub-layers, to be washed out with the next rain.

The first means of application for the new method of heat insulation of buildings, presents the following advantages:

1. A large amount of energy is saved and the pollution of the environment is decreased, since with the thermal insulation of the internal spaces of buildings, we succeed simultaneously:

The sound insulation of the buildings' internal spaces, against airborne sounds, the protection of the building materials and structural elements, from the stresses of climatic conditions and environmental influences and also the coloring of internal and external surfaces of the sub-layers of the internal and external masonry, the external roofs and the internal ceilings of the buildings.

1.1. We achieve a large saving of energy, and also, a smaller heating and cooling cost for the internal spaces of the buildings, for the following reasons:

a) Due to smaller losses of heating energy, at the starting of the heating of the internal spaces of the buildings.

b) Due to smaller losses of heating and cooling energy, from the reinforced concrete protrusions (thermal bridges) of the roofs and the facades.

c) Due to smaller losses of heating and cooling energy, of the internal spaces of the buildings, during their heating and cooling, 2. The effective surface of internal spaces of buildings is increased due to the reduction of the thickness of the external masonry.

3. A lower cost for the insulation of new and existing non-insulated buildings is achieved, thanks to the short duration of the insulation works.

4. A lower cost for the erection of new buildings is achieved, thanks to the lower cost for the insulation and the increase of the effective surface of the internal spaces of the buildings.

5. A thermal comfort is achieved, thanks to the uniform distribution of temperature, in the internal spaces Of the buildings.

6. A noise comfort is achieved, thanks to the uniform distribution of sound waves, inside the internal spaces of the buildings and an adding action of the sound waves ensues, which increases the acoustic impression.

The main advantages of the second method of application of the new method of thermal insulation of buildings are the following:

1. The possibility for the decoration of internal and external surfaces, of the sublayers of the external masonry and the external roofs of the buildings, is provided.

2. Large savings in energy is achieved, with the decrease of losses of heating and cooling energy, through the sublayers of the external masonry and the external roofs of the buildings and with the decrease of the heating energy losses at the starting of the heating of internal spaces of the buildings.

3. At the same time, the sound insulation of internal spaces of the buildings is achieved, against the airborne noises, with the attenuation of the absorbed sound waves inside the enclosed layer of air, with their consecutive reflections by the parallel heat-insulating and reflective internal surfaces.

4. The time of resonance of the internal spaces of buildings with large volume is decreased.

A practical application of the new heat insulating method for internal spaces of buildings, is given with reference to the attached drawings.

Figures 7, 8, 10:
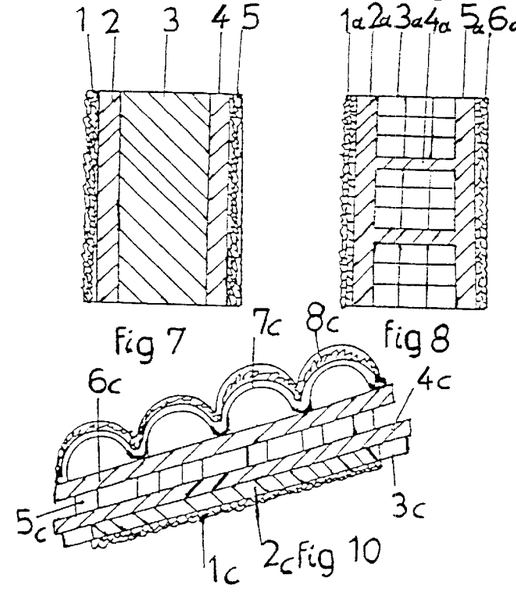
In FIG. 7 we see in section, a sublayer of a reinforced concrete low wall of the external masonry, thermally insulated against the cold and heat of the external environment.
In FIG. 8 we see in section, a sublayer of the external masonry, from perforated bricks, thermally insulated against the cold and heat of the external environment.
In FIG. 10 we see in section, a sublayer of the wooden roof with tiles (sloped roof), thermally insulated against the cold and heat of the external environment.

Referring to FIG. 7, the sublayer of the reinforced concrete low wall of the external masonry, is made up of the liquid reflective insulating material, type A, in solid form at its internal surface -1-, of a layer of common or heat insulating plaster at its internal side -2-, of a low reinforced concrete wall -3-, of a layer of common or heat insulating plaster, at its internal side -4- and of the liquid reflective insulating material type B in solid form, at its external surface -5-.

Referring to FIG. 8, the perforated bricks sublayer of the external masonry, is made up of the liquid reflective insulating material, type A, in solid form at its internal surface -1a-, of a layer of common plaster with sand, at its internal side -2a-, of the perforated bricks -3a-, of horizontal layers of common building plaster -4a-, of a layer of common building plaster with sand, at its external side -5a- and of the liquid reflective insulating material, type B in solid form, at its external surface -6a-.

Figure 9:
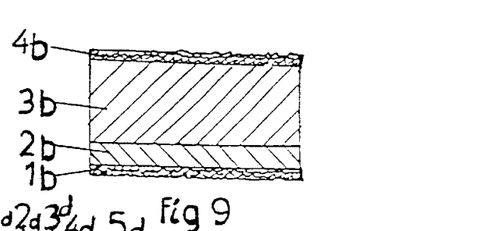
In FIG. 9 we see in section, a sublayer of the reinforced concrete slab of the terrace (roof), thermally insulated against the cold and heat of the external environment.

Referring to FIG. 9, the sublayer of the reinforced concrete slab of the terrace (roof), is made up of the liquid reflective insulating material, type A, in solid form at its internal surface -1b-, of a layer of common or heat insulating plaster, at its internal side -2b-, of the reinforced concrete slab -3b- and of the liquid reflective insulating material, type C in solid form, at its external surface -4b-.

Referring to FIG. 10, the sublayer of the wooden roof (sloping roof) with tiles, is made up of the liquid reflective insulating material, type A,. in solid form at its internal surface -1c-, of a layer of wooden revetment, at its internal side -2c-, of the supporting beams -3c-, of the chief-rafters -4c- of the cross-girders -5c-, layer of MDF -6c-, of a layer of tiles at its external side -7c- and the liquid reflective insulating material, type C in solid form, at its external surface -8c-.

Figure 11:
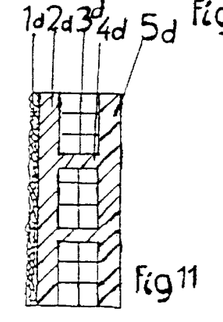
In FIG. 11 we see in section, a sublayer of the internal masonry, from perforated bricks which is adjacent to a non heated, closed space, thermally insulated against the cold.

Referring to FIG. 11, the sublayer of perforated bricks of the internal masonry, is made up of the liquid reflective insulating material, type A, in solid form at its internal surface -1d-, of a layer of common plaster, at its internal side -2d-, of the perforated bricks -3d-, of horizontal layers of common construction plaster -4d-, and a layer of common plaster with sand, at its external side -5d-.

Figure 12:
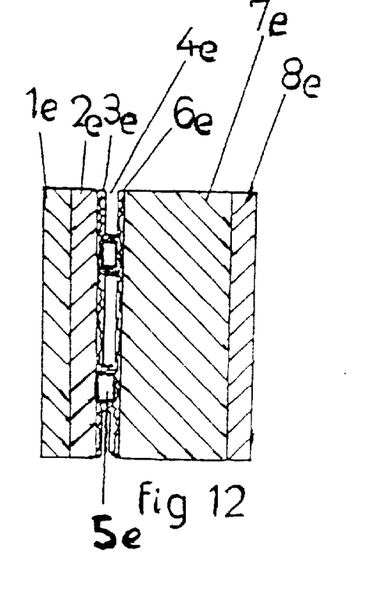
In FIG. 12 we see in section, a sublayer of a reinforced concrete low wall of the external masonry, with a parallel plane division, with enclosed layer of air.

Referring to FIG. 12, the sublayer of the reinforced concrete parapet of the external masonry, is made up of a layer of common plaster with sand, at its internal side -1e-, of a layer of plaster board -2e-, of the liquid reflective insulating material, type A, in solid form -3e-, of the enclosed layer of air -4e-, of the supports of the plaster board -5e-, of the liquid reflective insulating material type B in solid form -6e-, of the reinforced concrete parapet -7e- and of a layer of common plastering with sand, at its external side -8e-.

Figure 13:
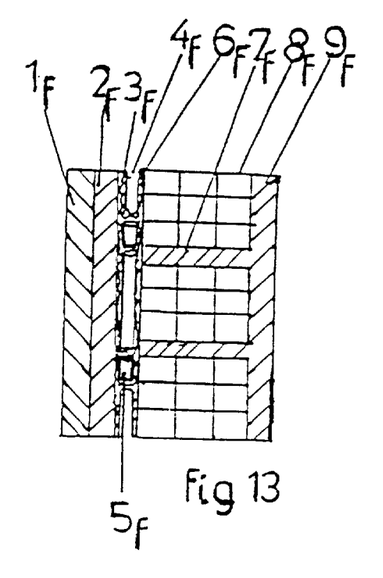
In FIG. 13 we see in section, a sublayer of the external masonry, from perforated bricks, with a parallel plane division, with enclosed layer of air.

Referring to FIG. 13, the sublayer of the perforated bricks of the external masonry, is made up of a layer of common plastering with sand, at its internal side -1f-, of a layer of plaster board -2f-, of the liquid reflective insulating material, type A, in solid form -3f-, of the enclosed layer of air -4f-, of the supports of the plaster board -5f-, of the liquid reflective insulating material type B in solid form -6f-, of the horizontal layers of common plastering -7f-, of the perforated bricks -8f- and of a layer of common plastering with sand, at its external side -9f-.

Figure 14:
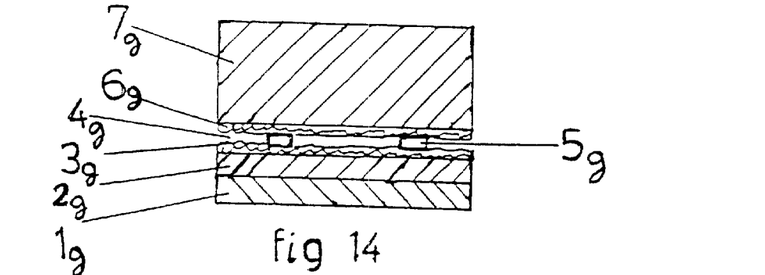
In FIG. 14 we see in section, a sublayer of the reinforced concrete slab of the terrace (roof, with a parallel plane division, with enclosed layer of air.

Referring to FIG. 14, the sublayer of the reinforced concrete slab of the terrace (roof), is made up of a layer of common plastering with sand, at its internal side -1g-, of a layer of plaster board -2g-, of the liquid reflective insulating material, type A, in solid form -3g-, of the enclosed layer of air -4g-, of the supports of the plaster-board -5g-, of the liquid reflective insulating material type C in solid form -6g- and of the reinforced concrete slab -7g-.

Figure 15:
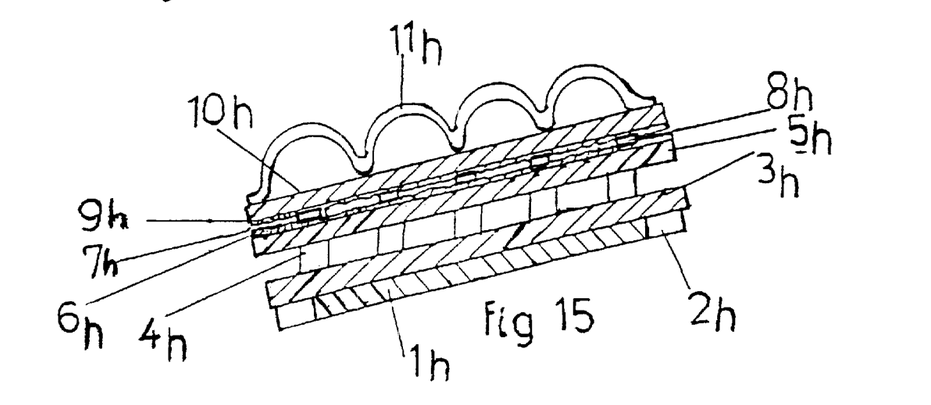
In FIG. 15 we see in section, a sublayer of the wooden roof with tiles (sloped roof), with a parallel plane division, with enclosed layer of air.

Referring to FIG. 15, the sublayer of the wooden roof (sloping roof) with tiles, is made up of a layer of wooden revetment, at its internal side -1h-, of the supporting beams -2h-, of the chief-rafters -3h-, of the cross-girders -4h-, of a layer of MDF -5h-, of the liquid reflective insulating material, type A in solid form -6h-, of the enclosed layer of air -7h-, of the supports of the plaster board -8h-, of the liquid reflective insulating material, type C in solid form -9h-, of a layer of MDF -10h- and of a layer of tiles at its external side -11h-.

In the new method of thermal insulation of buildings:

The coefficient of heat convey (the coefficient of thermal transmittance) K, of every sublayer of the construction materials and the structural elements, is decreased with the decrease of the quantity of absorbed energy, by the falling thermal radiation and by the failing thermal transition of the air, from the internal and the external surface of the sublayer.

The quantity of absorbed energy, by the internal and external surface of the sublayer, is reduced as follows:

a) By reflection (reemission) of the larger quantity of energy of the falling thermal radiation and the falling thermal transition of the air, from the reflective and heat insulating internal and external surface of the sublayer.

b) By reducing the thermal flow through the sublayer, which is transmitted by thermal radiation and thermal transition of the enclosed air within the sublayer, due to the low degree of exchange of thermal radiation, between the parallel reflective and heat insulating internal surfaces and due to the reflection of the thermal transition of the enclosed air, from every parallel reflective and heat insulating internal surface.

The thermal flow of the heating energy $Q_\ominus$ in Kcal/m$^2$h and the thermal flow $Q_\psi$ in Kcal/m$^2$h which corresponds to the losses of cooling energy, through every non-insulated sublayer, is calculated with the relations:

$$Q_\ominus = K \cdot DT_1 \text{ and } Q_\psi = K \cdot DT_2.$$

Where:

K is the coefficient of heat convey of every non-insulated sublayer in Kcal/m$^2$h° C.

$DT_1 = T_1 - T_2$, is the difference of temperature in Centigrade, between the temperature $T_1$ of the internal air and the temperature $T_2$ of the external air.

$DT_2 = T_2 - T_1$, is the difference of temperature in Centigrade, between the temperature $T_2$ of the external air and the temperature $T_1$ of the internal air.

The thermal flow of the heating energy $Q_1$ in Kcal/m$^2$h through every heat insulated sublayer, is calculated with the relation:

$$Q_1 = K_1 \cdot DT_1 = Q_\ominus - Q_{\ominus r}.$$

Where:

$Q_{\ominus r}$ is the reflected energy in Kcal/m$^2$h from the internal surface of the sublayer, and is calculated with the relation: $Q_{\ominus r} = Q_\ominus \cdot \rho_{\Sigma 1}$.

$K_1$ is the coefficient of the thermal convey in Kcal/m$^2$h° C., of the thermal flow of heating energy through the heat insulating sublayer.

$\rho_{\Sigma 1}$ is the overall coefficient of the reflection of the internal surface of the sublayer, or the overall coefficient of the diminution of the thermal flow of the heating energy, through the sublayer, which is transmitted with thermal radiation and with thermal transition of the enclosed air, inside the sublayer.

Since:

$$Q_1 = K_1 \cdot DT_1 = Q_\ominus - Q_{\ominus r} = Q_\ominus - Q_\ominus \cdot \rho_{\Sigma 1} = Q_\ominus \cdot (1 - \rho_{\Sigma 1}).$$

$K_1$ is: $K_1 = \dfrac{Q_1}{DT_1} = \dfrac{Q_\ominus}{DT_1} \cdot (1 - \rho_{\Sigma 1}) \Rightarrow K_1 = K \cdot (1 - \rho_{\Sigma 1}),$ because $\dfrac{Q_\ominus}{DT_1} = K$ of the nonnsulated sublayer.

The overall coefficient $\rho_{\Sigma 1}$ of the diminution of the thermal flow of the heating energy through the sublayer, is also the overall diminution coefficient $\rho_{\Sigma 1}$ of the coefficient of thermal convey K of the non-insulated sublayer and is equivalent to an increase of the thermal leak resistance $1/\Lambda$ of the sublayer, by $$\frac{D}{\lambda} = \frac{1}{K_1} - \frac{1}{K} \text{ in m}^2\text{h °C./Kcal.}$$

The thermal flow $Q_2$ in Kcal/m$^2$h, from the external environment to the internal spaces of the buildings, through the thermally insulated sublayer, corresponds to the losses of cooling energy, through the sublayer and is calculated with the relation:

$$Q_2 = K_2 \cdot DT_2 = Q_\psi - Q_{\psi r}.$$

Where:

$Q_{\psi r}$ is the reflected energy in Kcal/m$^2$h from the external surface of the sublayer, and is calculated by the relation: $Q_{\psi r} = Q_\psi \cdot \rho_{\Sigma 2}$.

$K_2$ is the coefficient of heat conveyance in Kcal/m$^2$h° C. of the thermal flow through the thermally insulated sublayer, from the external environment, to the internal spaces of the buildings.

$\rho_{\Sigma 2}$ is the overall reflection coefficient of the external surface of the sublayer, or the overall coefficient of the reduction of the thermal flow which corresponds to the losses of cooling energy, through the sublayer, which is transmitted. with thermal radiation and with thermal transition of the enclosed air, inside the sublayer. Because:

$$Q_2 = K_2 \cdot DT_2 = Q_\psi - Q_{\psi r} = Q_\psi - Q_\psi \cdot \rho_{\Sigma 2} = Q_\psi \cdot (1 - \rho_{\Sigma 2}).$$

$K_2$ is: $K_2 = \dfrac{Q_2}{DT_2} = \dfrac{Q_\psi}{DT_2} \cdot (1 - \rho_{\Sigma 2}) \Rightarrow K_2 = K \cdot (1 - \rho_{\Sigma 2}),$ because $\dfrac{Q_\psi}{DT_2} = K$ of the non-insulated sublayer.

The overall reduction coefficient PE2 of the losses of cooling energy through the sublayer, is also the overall reduction coefficient $\rho_{\Sigma 2}$ of the coefficient K of the heat convey of the non-insulated sublayer, and is equivalent to the increase of the thermal leak resistance 1/Λ of the sublayer, $$\text{by } \frac{D}{\lambda} = \frac{1}{K_2} - \frac{1}{K} \text{ m}^2\text{h } °\text{C./Kcal.}$$

Every sublayer of the construction materials and the structural elements which is thermally insulated against the cold and heat of the external environment, operates with a reduced coefficient of heat conveyance $K_1$, of the thermal flow of heating energy and with a reduced coefficient of heat conveyance $K_2$ of the thermal flow which corresponds to the losses of cooling energy, through it.

The overall coefficients of reduction $\rho_{\Sigma 1}$ and $\rho_{\Sigma 2}$ are comparative magnitudes for the reduction of the thermal flow, through every sublayer of the construction materials and the structural elements.

The first mode for the implementation of the new method of heat insulation of buildings, provides the following possibilities:

1. The heat insulation of the internal spaces of buildings against the cold of the external environment, which is realized as follows:

The internal surfaces of sublayers of the external masonry and roofs of the buildings, as well as the internal surfaces of sublayers of the internal masonry, which are adjacent to no heated closed spaces, are coated with the white colored liquid reflective insulating material, type A, with a minimum approximate coating thickness of approximately D=0.3 millimeters.

These sublayers, operate with a reduced coefficient of thermal conveyance $K_1$ of the heating energy losses, through them.

Simultaneously, a sound insulation of the internal spaces against the airborne noise, is obtained through these sublayers to the direction of every adjacent internal or external space.

2. The heat insulation of the internal spaces of buildings against the heat of the external environment, which is realized as follows:

a) The external surfaces of sublayers of the external masonry of the buildings, as well as the external surfaces of the protrusions of these sublayers are coated with the white colored liquid reflective insulating material, type B, with a minimum approximate coating thickness of approximately D=0.3 millimeters.

b) The external surfaces of sublayers of the internal masonry which are adjacent to non cooled closed spaces are coated with the white colored liquid reflective insulating material, type A, with a minimum approximate coating thickness of approximately D=0.3 millimeters.

c) The external surfaces of sublayers of the external roofs of the buildings, as well as the external surfaces of the protrusions of these sublayers are coated with the white colored liquid reflective insulating material, type C, with a minimum approximate coating thickness of D=0.4 millimeters.

These sublayers operate with a reduced coefficient of thermal conveyance $K_2$ of the thermal flow which corresponds to the cooling energy losses, through them.

Simultaneously, a sound insulation of the internal spaces against the airborne noise, is obtained through these sublayers from the external environment and from every adjacent, non cooled internal space.

3. The heat insulation of the internal spaces of buildings against the cold and the heat of the external environment, which is realized as described above, in paragraphs 1 and 2.

A practical application is show in Drawings FIG. 7, FIG. 8, FIG. 9 and FIG. 10.

The sublayers of the external masonry, of the external roofs and the sublayers of the internal masonry, which are adjacent to non-heated and to non cooled closed spaces, operate with a reduced coefficient of heat conveyance $K_1$ of the losses of heating energy and with a reduced coefficient of heat conveyance $K_2$ of the losses of cooling energy, through them.

Simultaneously, a sound insulation of the internal spaces of the buildings against the airborne noise, is obtained through these sublayers from every adjacent internal or external space and from the external environment.

The liquid reflective insulating material is mixed with a mixer adapted to a slow, electric bore machine, before being coated and every ten to fifteen minutes during all the length of the coating, in order to have an isomeric distribution of its ingredients on every coated surface.

The liquid reflective insulating material must dry normally, not to be absorbed abruptly and not to evaporate abruptly.

It is coated with an environmental temperature of +5° C. to +30° C.

It is coated with a roll and every coat is applied crosswise, after the previous one has dried.

The surfaces of the sublayers of the construction materials and structural elements, which will be coated with the liquid reflective insulating material, must be clean (they are washed with water in order to remove the dust), dry and solid (hard).

The solidification of the surfaces of the sublayers of the construction materials and structural elements, in order to reduce the cost, is made with their impregnation (priming) with an elastic acrylic synthetic emulsion (with a high content of plastic substances), which is coated with a paintbrush or a brush.

Follows a smoothening out of the internal and external surfaces of the sublayers of the external masonry, of the surfaces of sublayers of internal masonry and of the internal surfaces of the sublayers of internal ceilings of the buildings with acrylic stucco.

The smoothening out of the external surfaces of the sublayers of reinforced concrete of external roofs of buildings is made with a sealing cement plaster.

The expansion joints of the sublayers of reinforced concrete of the external masonry and the external roofs of buildings, are filled with a material of high elasticity, which does not acquire permanent deformations and are covered with an elastic polyesteric gauze for the strengthening of the elastic revetments, which is glued with an elastic, acrylic synthetic emulsion along all their length.

The losses of heating energy and cooling energy of the internal spaces of the buildings, through the sublayers of the external masonry and the external roofs of the buildings, as well as through the sublayers of their internal masonry and their internal ceilings adjoining to non heated and non cooled closed spaces, are decreased as follows:

At the fall of thermal radiation and thermal transition of the air, on the reflective and heat insulating internal and external surfaces of their sublayers, due to the small degree of derangement of the energy equilibrium in their mass, the larger part of the falling energy is reflected (retransmitted) and the quantity of energy penetrating these sublayers is reduced, having as result:

1. The temperature $T_{W1}$, of the internal surfaces of these sublayers is increased and the difference of temperature $DT_1 = T_1 - T_{W1}$ between the temperature $T_1$ of the internal air and the temperature $T_{W1}$ is decreased during the heating of the internal spaces of the buildings.

Due to the decrease of the difference of temperature $DT_1=T_1-T_{W1}$, the coefficient of heat convey K of the losses of heating energy, of every upper sublayer of the construction materials and structural elements is decreased, because the difference of temperature $DT_1=T_1-T_{W1}$ is the motive power for the losses of heating energy, through these sublayers.

The percentage of decrease of the difference in temperature $DT_1=T_1-T_{W1}$ is equal to the percentage of the overall reflection coefficient of every internal surface of these sublayers, is equal to the percentage of decrease of the heat conveyance coefficient K and remains constant at the increase and decrease of the losses of heating energy, through every above mentioned sublayer.

2. The temperature $T_{W2}$ of the external surfaces of these sublayers is increased and the difference of temperature $DT_2=T_2-T_{W2}$ between the temperature $T_2$ of the external air and the temperature $T_{W2}$ during the cooling of the internal spaces of buildings is decreased.

Due to the decrease of the difference of temperature $DT_2=T_2-T_{W2}$, the coefficient K of heat conveyance of the losses of cooling energy of every above mentioned sublayer of the building materials and structural elements is decreased, because the difference of temperature $DT_2=T_2-T_{W2}$, is the motive power for the thermal flow, through these sublayers, which corresponds to the losses of cooling energy, through these sublayers.

The percentage of decrease of the difference in temperature $DT_2=T_2-T_{W2}$ is equal to the percentage of the overall reflection coefficient of every external surface of these sublayers, is equal to the percentage of decrease of the coefficient of heat conveyance K and remains constant at the increase and decrease of the thermal flow, which corresponds to the losses of the cooling energy, through every above mentioned sublayer.

The coefficient of reflection of the thermal radiation $\rho$ and the coefficient of reflection of the thermal transition of the air $\rho_1$, of every internal and external surface of the above sublayers, decrease the coefficient K of the heat conveyance of every above sublayer, of the building materials and the structural elements, because they remain constant at the increase and decrease of the losses of heating energy and cooling energy, through every, above mentioned sublayer.

During the heating of the internal spaces of buildings, the overall coefficient of decrease $\rho_{\Sigma 1}$ of the coefficient of heat conveyance K of the losses of heating energy of every above sub-layer, depends on the mode of heat transmission for the heating of the internal air, that is:

a) During the heating of the internal spaces of buildings, with radiators of thermal radiation, the transfer of heat for the heating of the internal air is made with thermal radiation.

The reflection of the larger quantity of falling energy, by the internal surface of every above sub-layer, is made with the reflection coefficient of the thermal radiation $\rho$.

$\rho_{\Sigma 1}=\rho$ and $K_1=K-K\cdot\rho_{\Sigma 1}=K\cdot(1-\rho_{\Sigma 1})=K\cdot(1-\rho)$.

b) During the heating of the internal spaces of buildings, with the adduction of heated air, the transfer of heat for the heating of the internal air is made with thermal transition towards the adjacent internal air.

The reflection of the larger quantity of the falling energy, by the internal surface of every above sublayer, is made with the coefficient of reflection of the thermal transition of the air $\rho_1$, as follows:

At the initiation and during the heating operation, a quantity of energy from the falling thermal transition of the internal air is reflected while at the same time, the larger quantity of energy from the falling thermal radiation, which is emitted by the surfaces of the internal objects, of the internal masonry and the internal roofs is reflected.

$\rho_{\Sigma 1}=\rho_1$ and $K_1=K-K\cdot\rho_{\Sigma 1}=K\cdot(1-\rho_{\Sigma 1})=K\cdot(1-\rho_1)$.

c) During the heating of the internal spaces of buildings, with contact-transfer radiators, the transfer of heat for the heating of the internal air, is made with thermal radiation and with thermal transition to the adjacent internal air.

The reflection of larger quantity of the falling energy, by the internal surface of every above sub-layer, is made with the coefficient of reflection $\rho$ and $\rho_1$.

$\rho_{\Sigma 1}=\rho\cdot n\%+\rho_1\cdot n_1\%$ and $K_1=K-K\cdot\rho_{\Sigma 1}=K\cdot(1-\rho_{\Sigma 1})$.

Where:

$\rho$ and $\rho_1$ are the coefficients of reflection of every internal surface of the above sublayers.

n % is the percentage of heat transmission of the heat radiators with thermal reflection.

$n_1$% is the percentage of heat transmission of the radiators with thermal transition to the internal air which is in contact.

The overall decrease coefficient $\rho_{\Sigma 1}$ is equivalent to the increase of the thermal leak resistance $1/\Lambda$ of every above sublayer of building materials and structural elements, by $$\frac{D}{\lambda} = \frac{1}{K_1} - \frac{1}{K} \text{ in m}^2\text{h }°\text{C./Kcal.}$$

in m²h° C./Kcal.

During the cooling of internal spaces of buildings, the transmission of heat for the heating of the external air, is made with thermal (solar) radiation. The reflection of the larger part of the falling energy, from every external surface of the sub-layers of the external masonry and the external roofs, is made with the reflection coefficient of the thermal radiation $\rho$.

$\rho_{\Sigma 2}=\rho$ and $K_2=K-K\cdot\rho_{\Sigma 2}=K\cdot(1-\rho_{\Sigma 2})=K\cdot(1-\rho)$.

During the operation of cooling of the internal spaces of the buildings, in which the transmission of the larger part of heat, to the external surfaces of these sub-layers is made with a thermal transition from the external air, these sublayers operate with a reduced coefficient of heat conveyance $K_2$, of the losses of the cooling energy, by:

$\rho_{\Sigma 2}=\rho_1$ and $K_2=K-K\cdot\rho_{\Sigma 2}=K\cdot(1-\rho_{\Sigma 2})=K\cdot(1-\rho_1)$.

The overall decrease coefficient $\rho_{\Sigma 2}$ is equivalent to the increase of the thermal leak resistance $1/\Lambda$ of every above sublayer of the building materials and the structural elements, by $$\frac{D}{\lambda} = \frac{1}{K_2} - \frac{1}{K} \text{ in m}^2\text{h }°\text{C./Kcal.}$$

The low coefficient $\epsilon$ of thermal radiation emission, of the internal and external surfaces of the sublayers of the external masonry and the external roofs of the buildings, is not taken into consideration at the decrease of the coefficient of heat conveyance K of these sublayers, because:

During the heating of the internal spaces of the buildings, the transmission of the larger quantity of heat, from the external surfaces of these sublayers, is made with a thermal transition towards the adjacent external air.

During the cooling of the internal spaces of the buildings, the transmission of the larger quantity of heat, from the internal surfaces of these sublayers, is made with a thermal transition towards the adjacent internal air.

The reflection coefficients ρ and $\rho_1$ for the three types A, B and C of the liquid reflective insulating material, in solid form, are experimentally defined by the coefficient of heat transfer K, of the non-insulated sublayer and by the coefficients of heat transfer $K_1$ and $K_2$ of the heat-insulated sublayer, that is:

$$\text{Type A: } \rho\% \text{ and } \rho_1\% = \left(1 - \frac{K_1}{K}\right) \cdot 100 = Q_{\ominus r} \cdot \frac{100}{Q_\ominus}$$

$$\text{Types B and C: } \rho\% \text{ and } \rho_1\% = \left(1 - \frac{K_2}{K}\right) \cdot 100 = Q_{\psi r} \cdot \frac{100}{Q_\psi}$$

Where:
$K_1$ is the coefficient of heat transfer of the heat flow of heating energy, through the heat-insulated sub-layer.
$K_2$ is the coefficient of heat transfer of the heat flow through the heat-insulated sublayer, which corresponds to the losses of the cooling energy.
$Q_{\ominus r} = Q_\ominus - Q_1$, is the reflected energy in W or Kcal, from the internal surface of the heat-insulated sub-layer.
$Q_\ominus$ and $Q_1$, are the heat flow of the heating energy in W or Kcal, through the non-insulated sub-layer ($Q_\ominus$) and through the heat-insulated sub-layer ($Q_1$).
$Q_{\psi r} = Q_\psi - Q_2$, is the reflected energy in W or Kcal, from the external surface of the heat-insulated sub-layer.
$Q_\psi$ and $Q_2$, are the heat flow in W or Kcal, corresponding to the cooling energy losses, through the non-insulated sub-layer ($Q_\psi$) and through the heat-insulated sub-layer ($Q_2$).

The sublayers of reinforced concrete have a low resistance of thermal leak D/Λ.

The revetment of the internal and external side of the sublayers of reinforced concrete of the external masonry with a heat insulating plastering, as well as the internal side of the sublayers of reinforced concrete of the external roofs of buildings, provides the possibility to these sublayers to operate with low coefficients of heat conveyance $K_1$ and $K_2$, without increasing their thickness.

The addition of coloring substances to the liquid reflective insulating material in order to change its white color, decreases the reflection coefficients ρ and $\rho_1$.

The reflection coefficient of the thermal transition of the air $\rho_1$, is less decreased than the reflection coefficient of the thermal radiation ρ and provides the possibility of flexibility in the choice of light colors.

For a smaller decrease of the reflection coefficients ρ and $\rho_1$, the covering in volume per square meters has to be preserved also with the increased volume of the liquid reflective insulating material per volume of the coloring substances.

The addition of water to the liquid reflective insulating material has a result the creation of pores (thermal bridges), in every reflective and heat insulating internal and external surface of the sublayers, of the construction materials and the structural elements, given that the volume of pores created after the evaporation is equal to the volume of the added water.

Example for the calculation of the reduced coefficients of heat conveyance $K_1$ and $K_2$ of the sublayer of a reinforced concrete parapet, of the external masonry, FIG. 7, with the following data:

White colored liquid reflective insulating material, type A in solid form -1-.

ρ=80% and $\rho_1$=86%.

Layers of heat insulating plastering -2- and -4-.

$D_2=D_4=2$ centimeters and $\lambda_2=\lambda_4=0.07$ Kcal/mh° C.

Reinforced concrete parapet -3-.

$D_3=20$ centimeters and $\lambda_3=1.75$ Kcal/mh° C.

White colored liquid reflective insulating material, type B in solid form -5-.

ρ=82% and $\rho_1$=88%.

Coefficient of thermal transition of the internal air $a_1=7$ Kcal/m²h° C., for a natural circulation of the air.

Coefficient of thermal transition of the external air $a_2=20$ Kcal/m²h° C., for an air velocity of two meters per second (u=2 m/sec).

The coefficients $a_1$ and $a_2$ are given by the Regulations of Heat Insulation of Buildings.

The resistance to heat leak 1/Λ of the non-insulated sublayer, is:

$$\frac{1}{\Lambda} = \frac{D_2}{\lambda_2} + \frac{D_3}{\lambda_3} + \frac{D_4}{\lambda_4}$$

$$= \frac{0,02}{0,07} + \frac{0,2}{1,75} + \frac{0,02}{0,07} \Rightarrow \frac{1}{\Lambda}$$

$$= 0,684 \text{ m}^2\text{h }° \text{ C./Kcal.}$$

The coefficient of heat transfer K of the non-insulated sublayer is calculated with the equation:

$$\frac{1}{K} = \frac{1}{a_1} + \frac{1}{\Lambda} + \frac{1}{a_2} = \frac{1}{7} + 0,684 + \frac{1}{20} \Rightarrow \frac{1}{K}$$

$$= 0,874 \text{ m}^2\text{h }° \text{ C./Kcal} \Rightarrow$$

=>K=1:0.874=1.144 Kcal/m²h° C. or K=1.33 W/m²K.

1. During the heating of internal spaces of buildings, with heat radiating radiators $\rho_{\Sigma 1}=\rho=80\%$.

The reduced coefficient of heat conveyance $K_1$ is:

$K_1=K \cdot (1-\rho_{\Sigma 1})=K \cdot (1-\rho)=1.144 \cdot (1-80\%)=>$

=>$K_1$=0.229 Kcal/m²h° C. or $K_1$=0.266 W/m²K.

The overall coefficient of reduction $\rho_{\Sigma 1}=\rho=80\%$ is equivalent to an increase of the resistance of the heat leak 1/Λ of the sublayer, by $$\frac{D}{\lambda} = \frac{1}{K_1} - \frac{1}{K} = \frac{1}{0,229} - \frac{1}{1,144} \Rightarrow \frac{D}{\lambda} = 3,492 \text{ m}^2\text{h }° \text{ C./Kcal.}$$

With the conventional heat insulation of the sublayer, with a heat insulating material having λ=0.023 Kcal/mh° C., it is required to have a thickness of the heat insulating material:

D=3.492·0.023·100=8 centimeters.

2. During the heating of internal spaces of buildings, with the adduction of hot air $\rho_{\Sigma 1}=\rho_1=86\%$.

The reduced coefficient of heat conveyance $K_1$ is:

$$K_1 = K \cdot (1-\rho_{\Sigma 1}) = K \cdot (1-\rho_1) = 1.144 \cdot (1-86\%) \Rightarrow K_1 = 0.16 \text{ Kcal/m}^2\text{h}° \text{ C.}$$

or $$K_1 = 0.186 \text{ W/m}^2\text{K.}$$

The overall coefficient of reduction $\rho_{\Sigma 1} = \rho_1 = 86\%$ is equivalent to an increase of the resistance of the heat leak $1/\Lambda$ of the sublayer, by $$\frac{D}{\lambda} = \frac{1}{K_1} - \frac{1}{K} = \frac{1}{0.16} - \frac{1}{1.144} \Rightarrow \frac{D}{\lambda} = 5.376 \text{ m}^2\text{h} ° \text{ C./Kcal.}$$

With the conventional heat insulation of the sublayer, with a heat insulating material having $\lambda = 0.023$ Kcal/mh° C., it is required to have a thickness of the heat insulating material:

$$D = 5.376 \cdot 0.023 \cdot 100 = 12.36 \text{ centimeters.}$$

3. During the heating of internal spaces of buildings, with contact-conveyance radiators, for which n=40% and $n_1$=60%:

$$\rho_{\Sigma 1} = \rho \cdot n\% + \rho_1 \cdot n_1\% = 80\% \cdot 40\% + 86\% \cdot 60\% \Rightarrow$$

$$\Rightarrow \rho_{\Sigma 1} = 83.6\%.$$

$$K_1 = K \cdot (1-\rho_{\Sigma 1}) = 1.144 \cdot (1-83.6\%) \Rightarrow$$

$$\Rightarrow K_1 = 0.187 \text{ Kcal/m}^2\text{h}° \text{ C. or } K_1 = 0.217 \text{ W/m}^2\text{K.}$$

The overall coefficient of reduction $\rho_{\Sigma 1} = 83.6\%$ is equivalent to an increase of the resistance of the heat leak $1/\Lambda$ of the sublayer, by $$\frac{D}{\lambda} = \frac{1}{K_1} - \frac{1}{K} = \frac{1}{0.187} - \frac{1}{1.144} \Rightarrow \frac{D}{\lambda} = 4.473 \text{ m}^2\text{h} ° \text{ C./Kcal.}$$

With the conventional heat insulation of the sublayer, with a heat insulating material having $\lambda = 0.023$ Kcal/mh° C., it is required to have a thickness of the heat insulating material:

$$D = 4.473 \cdot 0.023 \cdot 100 = 10.28 \text{ centimeters.}$$

4. During the cooling of internal spaces of buildings $\rho_{\Sigma 2} = \rho = 82\%$.

The reduced coefficient $K_2$ of heat conveyance is:

$$K_2 = K \cdot (1-\rho_{\Sigma 2}) = K \cdot (1-\rho) = 1.144 \cdot (1-82\%) \Rightarrow K_2 = 0.206 \text{ Kcal/m}^2\text{h}° \text{ C.}$$

or $$K_2 = 0.24 \text{ W/m}^2\text{K.}$$

The overall coefficient of reduction $\rho_{\Sigma 2} = \rho = 82\%$ is equivalent to an increase of the resistance of the heat leak $1/\Lambda$ of the sublayer, by $$\frac{D}{\lambda} = \frac{1}{K_2} - \frac{1}{K} = \frac{1}{0.206} - \frac{1}{1.144} \Rightarrow \frac{D}{\lambda} = 3.98 \text{ m}^2\text{h} ° \text{ C./Kcal.}$$

With the conventional heat insulation of the sublayer, with a heat insulating material having $\lambda = 0.023$ Kcal/mh° C., it is required to have a thickness of the heat insulating material:

$$D = 3.98 \cdot 0.023 \cdot 100 = 9.15 \text{ centimeters.}$$

During the cooling of internal spaces of buildings, where the transmission of the larger quantity of heat, to the external surface of the sublayer is made with thermal transition from the external air.

The sublayer operates with a reduced coefficient of heat conveyance $K_2$ by $\rho_{\Sigma 2} = \rho_1 = 88\%$, that is:

$$K_2 = K \cdot (1-\rho_{\Sigma 2}) = K \cdot (1-\rho_1) = 1.144 \cdot (1-88\%) \Rightarrow K_2 = 0.137 \text{ Kcal/m}^2\text{h}° \text{ C.}$$

or $$K_2 = 0.159 \text{ W/m}^2\text{K,}$$

and further reduction by 33.4% of the losses of the cooling energy is obtained through the sublayer.

The sublayers of the external masonry and the external roofs of the buildings, which are not possible to be heat-insulated, due to the decoration of their internal or external surfaces, are thermally insulated with the second mode of implementation of the new method of heat insulation of buildings.

A practical application of the second mode of application of the new method of heat insulation of buildings is shown in Drawings FIG. 12, FIG. 13, FIG. 14 and FIG. 15.

The second mode of application of the new method of heat insulation of buildings offers the following possibilities:

1. Heat insulation of internal spaces of buildings, against the cold and heat of the external environment, which is realized as follows:

With the construction of a parallel plane division with an enclosed layer of air, at the internal side of the sublayers of the external masonry and the external roofs of the buildings, by which is achieved the thermal flow, with thermal radiation and with thermal transition of the air through these sublayers and the reduction of the losses of heating energy, at the initiation of the heating operation of the internal spaces of the buildings.

At the same time is also achieved the sound insulation of the internal spaces of the buildings, against the airborne noise through these sublayers, towards any adjacent internal or external space and from the external environment.

2. The possibility of a reliable construction of sublayers of the external masonry and the external roofs of buildings, with a parallel plane division with an enclosed layer of air at their internal side, due to the small thickness of the enclosed layer of air, up to D=10 millimeters.

In order to avoid the creation of thermal bridges:

Every junction line of the sublayers of reinforced concrete with building plaster, is internally and externally covered with an elastic polyesteric gauze for the strengthening of the elastic over-coatings, which is glued with an elastic acrylic synthetic emulsion along its entire length.

The supports of the plaster-boards and the MDF are fixed on plastic bases and their surface which is in contact with the enclosed air, is covered with the white color liquid reflective material of type B or C, with a minimum layer thickness of D=0.4 millimeters approximately.

The plaster-boards and MDF are joined together with a groove for a better fitting, and the surface of every groove is coated with the liquid reflective insulating type B or type C white colored material.

Every junction line of the plaster-boards and MDF is covered externally with an elastic polyesteric gauze for the strengthening of the elastic revetments, which is glued with an elastic acrylic synthetic emulsion along its entire length.

The perimetric surface of the thickness of the MDF is coated the type C white colored liquid reflective insulating material, with a minimum coat thickness of approximately D=0.4 millimeters, because the larger part of the heating is transmitted to their mass, along their fibers.

3. Increased energy saving, by reducing the thermal flow through these sublayers, which is transmitted with thermal radiation and with thermal transition of the enclosed air inside these sublayers, due to the low degree of exchange of thermal radiation, between the parallel reflective and heat insulating internal surfaces and due to the reflection of the thermal transition of the enclosed air, from every parallel reflective and heat-insulating internal surface.

The reduction of the thermal flow through these sublayers due to the small degree of disturbance of the energy equilibrium, in the mass of the parallel reflective and heat insulating internal surfaces during the exchange of thermal radiation between them and during the fall of the thermal transition of the enclosed air in them, has the following results:

1. The temperature $T_{W1}$ of the internal surfaces of these sublayers is increased, and the difference of temperature $DT_1=T_1-T_{W1}$, between the temperature $T_1$ of the internal air and the temperature $T_{W1}$ during the heating of the internal spaces of the buildings is decreased.

Due to the reduction of the difference of temperature $DT_1=T_1-T_{W1}$, the coefficient of thermal convey K of the losses of heating energy of every above sublayer of the building materials and structural elements is decreased, because the difference of temperature $DT_1=T_1-T_{W1}$ is the driving force for the losses of the heating energy through every one of the above sublayers.

The percentage of reduction of the difference in temperature $DT_1=T_1-T_{W1}$, is equal to the percentage of reduction of the thermal flow through every sublayer of the building materials and the structural elements, is. equal to the percentage of reduction of the coefficient of heat convey K, and remains constant during the increase and decrease of the losses of heating energy, through every above sublayer.

2. The temperature $T_{W2}$ of the external surfaces of these sublayers is increased and the difference of temperature $DT_2=T_2-T_{W2}$ between the temperature $T_2$ of the external air and the temperature $T_{W2}$ during the cooling of the internal spaces of the buildings is decreased.

Due to the reduction of the difference of temperature $DT_2=T_2-T_{W2}$, the coefficient K of the losses of cooling energy, of thermal convey of every above sublayer of the building materials and structural elements is decreased, because the difference of temperature $DT_2=T_2-T_{W2}$ is the driving force for the heat flow through these sub-layers, which corresponds to the losses of the cooling energy through these sublayers.

The percentage of reduction of the difference in temperature $DT_2=T_2-T_{W2}$, is equal to the percentage of reduction of the thermal flow through every sublayer of the building materials and the structural elements, is equal to the percentage of reduction of the coefficient of heat convey K and remains constant during the increase and decrease of the thermal flow (losses of cooling energy), through every above sublayer.

The coefficient of emission of the thermal radiation $\epsilon$, the coefficient of reflection of the thermal radiation $\rho$, and the coefficient of reflection of the thermal transition of the air $\rho_1$ of every parallel reflective and heat-insulating internal surface, reduce the coefficient of thermal convey K of every above sublayer, of the building materials and structural elements, because they remain constant during the increase and decrease of the losses of heating and cooling energy, through every above sublayer.

The overall coefficient $P_{\Sigma 1}$ of reduction of the coefficient of thermal convey K of the losses of heating energy and the overall coefficient $\rho_{\Sigma 2}$ of reduction of the coefficient of thermal convey K of cooling energy of every above sublayer, of the building materials and structural elements are calculated as follows:

$$\rho_{\Sigma 1}=n_{12}\%\cdot C_{\mu 21}\%+n_{1\,12}\%\cdot \rho_1 \qquad (2).$$

$$\rho_{\Sigma 2}=n_{21}\%\cdot C_{\mu 21}\%+n_{1\,21}\%\cdot \rho_1 \qquad (1).$$

Where:

$n_{12}\%$ and $n_{21}\%$ is the percentage of the thermal flow by thermal radiation, through every above sublayer.

$C_{\mu 12}\%$ and $C_{\mu 21}\%$ is the percentage of the decrease of the degree of exchange of thermal radiation $C_{12}$ and $C_{21}$, between the internal parallel reflective and heat-insulating surfaces.

$$C_{12} = \frac{G_s}{\frac{1}{\varepsilon_1}+\frac{1}{\varepsilon_2}-1} \text{ in } W/m^2K^4 \text{ and } C_{21} = \frac{G_s}{\frac{1}{\varepsilon_2}+\frac{1}{\varepsilon_1}-1} \text{ in } W/m^2K^4.$$

$G_s=5.67$ W/m²K⁴ is the constant of the dark color.

$n_{1\,12}\%$ and $n_{1\,21}\%$ is the percentage of the thermal flow by thermal transition of the enclosed air, through every above sublayer.

$\rho_{1(2)}$ and $\rho_{1(1)}$ are the coefficients of reflection of the thermal transition of the air, of every parallel reflective and heat-insulating internal surface.

The reduced thermal convey coefficient $K_1$ of the losses of heating energy and the reduced thermal convey coefficient $K_2$ of the losses of cooling energy, of every above sublayer of the building materials and structural elements, is:

$$K_1=K-K\cdot\rho_{\Sigma 1}=K\cdot(1-\rho_{\Sigma 1}) \text{ and } K_2=K-K\cdot\rho_{\Sigma 2}=K\cdot(1-\rho_{\Sigma 2}).$$

The overall reduction coefficients $\rho_{\Sigma 1}$ and $\rho_{\Sigma 2}$ are equivalent to an increase of the resistance of thermal leak $1/\Lambda$ of every above sublayer of the building materials and structural elements, by $$\frac{D_1}{\lambda} = \frac{1}{K_1} - \frac{1}{K}$$

for the losses of the heating energy, and by $$\frac{D_2}{\lambda} = \frac{1}{K_2} - \frac{1}{K}$$

for the losses of the cooling energy, through every above sublayer.

The overall coefficients of decrease $\rho_{\Sigma 1}$ and $\rho_{\Sigma 2}$, in order to increase their accuracy, are defined experimentally (the same way as the reflection coefficients $\rho$ and $\rho_1$) from the coefficient of heat transfer K, of the non-insulated sublayer with enclosed layer of air and from the coefficients of heat transfer $K_1$ and $K_2$ of the heat-insulated sublayer with enclosed layer of air, that is:

$$\rho_{\Sigma 1}\% = \left(1 - \frac{K_1}{K}\right)\cdot 100 = Q_{\Theta r}\cdot \frac{100}{Q_\Theta} \text{ and}$$

$$\rho_{\Sigma 2}\% = \left(1 - \frac{K_2}{K}\right)\cdot 100 = Q_{\psi r}\cdot \frac{100}{Q_\psi}$$

Example for the calculation of the reduced coefficients of thermal convey $K_1$ and $K_2$, of a sublayer of perforated bricks, of the external masonry, FIG. 13, with the following data:

Layers of common plaster with sand -1f- and -9f-.

$D_{1f}=D_{9f}=2$ centimeters and $\lambda_{1f}=\lambda_{9f}=0.75$ Kcal/mh° C.

Layer of plaster-board -2f-. $D_{2f}$=10 millimeters and $\lambda_{2f}$=0.5 Kcal/mh° C.

Liquid reflective insulating white color material, type A in solid form -3f-.

$\epsilon_1$=0.2, $\rho_{(1)}$=80% and $\rho_{1(1)}$=86%.

Enclosed layer of air -4f-.

$D_{4f}$=10 millimeters and $\lambda_{4f}$=0.022 Kcal/mh° C.

Liquid reflective insulating white color material, type B in solid form -6f-.

$\epsilon_2$=0.18, $\rho_{(2)}$=82% and $\rho_{1(2)}$=88%.

Horizontal layers of common, building plaster -7f-.

$D_{7f}$=20 centimeters, $\lambda_{7f}$=0.75 Kcal/mh° C. and covering proportion $E_1$=0.1 square meter per square meter of external masonry.

Horizontal layers of perforated bricks -8f-.

$D_{8f}$=20 centimeters, $\lambda_{8f}$=0.45 Kcal/mh° C. and covering proportion $E_2$=0.9 square meter per square meter of external masonry.

Coefficient of thermal transition of the internal air, $a_1$=7 Kcal/m²h° C. for a natural circulation of the air.

Thermal transition coefficient of the external air, $a_2$=20 Kcal/m²h° C. for an air velocity of two meters per second (u=2 m/sec).

Emission coefficient of thermal radiation $\epsilon$, of every parallel internal surface $\epsilon_1$=$\epsilon_2$=0.93.

Thermal convey coefficient K of the non-insulated sublayer, without the enclosed layer of the air, K=1.507 Kcal/m²h° C.

The degree of thermal radiation exchange, between the parallel internal surfaces of the non-insulated sublayer, is the same for the losses of heating energy and the cooling energy, through the sublayer, that is:

$$C_{12} = C_{21} = \frac{G_s}{\frac{1}{\varepsilon_1}+\frac{1}{\varepsilon_2}-1} = \frac{5,67}{\frac{1}{0,93}+\frac{1}{0,93}-1} \Rightarrow C_{12}=C_{21}=4,93 \; W/m^2K^4$$

or $C_{12}$=$C_{21}$=4.239 Kcal/m²h° C.

The thermal transition coefficient of the enclosed air, $a_d$ is calculated as follows:

For a thickness of the enclosed layer of air $D_{4f}$=10 millimeters the Nusselt number is:

$$Nu = 1 = \frac{\lambda'}{\lambda_{4f}} = \frac{\alpha_d \cdot D_{4f}}{\lambda_{4f}} \Rightarrow \alpha_d = \frac{\lambda_{4f}}{D_{4f}} = \frac{0,022}{0,01} \Rightarrow \alpha_d = 2,2 \; Kcal/m^2h \; °C.$$

and is the same for the thermal flow of heating energy and the thermal flow which corresponds to losses of cooling energy through the sublayer.

The thermal flow Q through the non insulated sublayer with a enclosed layer of air, is:

$Q=C_{12}+a_d$=4.239+2.2=6.439 Kcal/m²h° C.=>$n_{12}$=$n_{21}$=65.8% and $n_{1\;12}$=$n_{1\;21}$=34.2%.

The thermal flow $Q = \frac{\lambda'}{D_{4f}} \Rightarrow 6,439 = \frac{\lambda'}{0,01} \Rightarrow \lambda' = 0,0644 \; Kcal/mh \; °C.$ The equivalent thermal leak resistance of the enclosed layer of air, is:

$$\frac{D_{4f}}{\lambda'} = \frac{0,01}{0,0644} = 0,155 \; m^2h \; °C./Kcal.$$

The thermal leak resistance of the layer of the plaster board is:

$$\frac{D_{2f}}{\lambda_{2f}} + \frac{D_{4f}}{\lambda'} = 0,02 \; m^2h \; °C./Kcal.$$

The overall thermal resistance 1/K of the non insulated sublayer with an enclosed layer of air is increased by, $$\frac{D_{2f}}{\lambda_{2f}} + \frac{D_{4f}}{\lambda'} = 0,02 + 0,155 = 0,175 \; m^2h \; °C./Kcal \; and \; becomes:$$

$$\frac{1}{K_d} = \frac{1}{K} + 0,175 = 0,838 \; m^2h \; °C./Kcal.$$

The heat convey coefficient $K_d$ of the non insulated sublayer with an enclosed layer of air is:

$$K_d = \frac{1}{0,838} = 1,193 \; Kcal/m^2h \; °C.$$

The degree of thermal radiation exchange, between the parallel reflective and heat insulating internal surfaces of the sublayer, is the same for the losses of the heating energy and the cooling energy through the sublayer, that is:

$$C_{12} = C_{21} = \frac{G_s}{\frac{1}{\varepsilon_1}+\frac{1}{\varepsilon_2}-1} = \frac{5,67}{\frac{1}{0,2}+\frac{1}{0,18}-1} \Rightarrow C_{12}=C_{21}=0,593 \; W/m^2K^4$$

or $C_{12}$=$C_{21}$=0.51 Kcal/m²h° C.

$$C_{\mu12}\% = C_{\mu21}\% = \frac{(4,93-0,593) \cdot 100}{4,93} \Rightarrow C_{\mu12} = C_{\mu21} = 87,8\%.$$

$\rho_{\Sigma1}$=$n_{12}\%\cdot C_{\mu12}\%+n_{1\;12}\%\cdot\rho_{1\;(2)}$=65.8%·87.8%+34.2%·88%=>

=>$\rho_{\Sigma1}$=87.8%.

$\rho_{\Sigma2}$=$n_{21}\%\cdot C_{\mu21}\%+n_{1\;21}\%\cdot\rho_{1\;(1)}$=65.8%·87.8%+34.2%·86%=>

=>$\rho_{\Sigma2}$=87.2%.

The reduced coefficients of heat convey $K_1$ and $K_2$ are:

$K_1$=$K_d$-$K_d\rho_{\Sigma1}$=$K_d(1-\rho_{\Sigma1})$=1.193·(1-87.8%)=>

=>$K_1$=0.146 Kcal/m²h° C. or $K_1$=0.17 W/m²K.

$K_2$=$K_d$-$K_d\rho_{\Sigma2}$=$K_d(=1.193\cdot(1-87.2\%)$=>

=>$K_2$=0.153 Kcal/m²h° C. 0r $K_2$=0.18 W/m²K.

The overall reduction coefficients $\rho_{\Sigma 1}$ and $\rho_{\Sigma 2}$ are equivalent to an increase of the resistance of the thermal leak $1/\Lambda$ of the non-insulated sublayer with an enclosed layer of air, by $$\frac{D_1}{\lambda} = \frac{1}{K_1} - \frac{1}{K_d} = 6 \text{ m}^2\text{h °C./Kcal and by}$$

$$\frac{D_2}{\lambda} = \frac{1}{K_2} - \frac{1}{K_d} = 5{,}67 \text{ m}^2\text{h °C./Kcal.}$$

In the conventional heat insulation of the sublayer, with a heat insulating material having an $\lambda=0.023$ Kcal/mh° C. it is required to have a thickness of heat insulating material: $D_1=6 \cdot 0.023 \cdot 100=13.8$ centimeters and $D_2=5.67 \cdot 0.023 \cdot 100=13$ centimeters.

The heat conveyance coefficient $K=1.507$ Kcal/m²h° C. of the non-insulated sublayer, without the enclosed layer of air, has been reduced by $\rho_{\Sigma 1}=90.3\%$ and by $\rho_{\Sigma 2}=89.8\%$.

The overall coefficients of reduction $\rho_{\Sigma 1}$ and $\rho_{\Sigma 2}$, are equivalent to an increase of the thermal leak resistance $1/\Lambda$ of the non-insulated sublayer without the enclosed layer of air, by $$\frac{D_1}{\lambda} = \frac{1}{K_1} - \frac{1}{K_d} = 6{,}18 \text{ m}^2\text{h °C./Kcal and by}$$

$$\frac{D_2}{\lambda} = \frac{1}{K_2} - \frac{1}{K_d} = 5{,}87 \text{ m}^2\text{h °C./Kcal.}$$

In conventional heat insulation of the sublayer, with a heat-insulating material having $\lambda=0.023$ Kcal/mh° C., it is required to have a thickness of heat insulating material:

$D_1=6.18 \cdot 0.023 \cdot 100=14.2$ centimeters and $D_2=5.87 \cdot 0.023 \cdot 100=13.5$ centimeters.

What is claimed is:

1. A heat insulation method for buildings, comprising the steps of:

coating internal and external surfaces of building substrates, and/or coating separating internal surfaces with an air interval inside the substrates, with a liquid reflective insulating material, the liquid reflective insulating material including an energy-reflective mixture of convex microscopic granules of expanded perlite or expanded ceramic material with a convex microscopic granulometry ranging from 1 to 130 $\mu$m, and at least one of titanium oxides, mineral sodium chloride, aluminum trioxide, and silicon oxide and at least one binder of pure acrylic, elastomer co-polymerized acrylic, synthetic materials and liquid silicone in a water solution.

* * * * *